United States Patent
HomChaudhuri et al.

(10) Patent No.: US 9,973,969 B2
(45) Date of Patent: May 15, 2018

(54) DYNAMIC FREQUENCY SELECTION CHANNEL SCAN OPTIMIZATIONS

(71) Applicant: QUALCOMM Incorporated, San Diego, CA (US)

(72) Inventors: Sandip HomChaudhuri, San Jose, CA (US); Pradeep Kumar Yenganti, Cupertino, CA (US); Michael Richard Green, Needham, MA (US); Alireza Raissinia, Monte Sereno, CA (US); Srinivas Katar, Fremont, CA (US); Hoon Ki Lee, San Jose, CA (US)

( * ) Notice: Subject to any disclaimer, the term of this patent is extended or adjusted under 35 U.S.C. 154(b) by 281 days.

(21) Appl. No.: 14/866,595

(22) Filed: Sep. 25, 2015

(65) Prior Publication Data

US 2017/0094556 A1    Mar. 30, 2017

(51) Int. Cl.
*H04W 28/06* (2009.01)
*H04L 12/801* (2013.01)
*H04W 48/16* (2009.01)
*H04W 84/12* (2009.01)

(52) U.S. Cl.
CPC ............. *H04W 28/06* (2013.01); *H04L 47/11* (2013.01); *H04W 48/16* (2013.01); *H04W 84/12* (2013.01)

(58) Field of Classification Search
CPC ....... H04W 28/06; H04W 48/16; H04L 47/11; Y02B 60/50; Y02D 70/14; Y02D 70/142
See application file for complete search history.

(56) References Cited

U.S. PATENT DOCUMENTS

| | | | |
|---|---|---|---|
| 7,206,840 B2 | 4/2007 | Choi et al. | |
| 2005/0063334 A1 | 3/2005 | Fnu et al. | |
| 2006/0072602 A1 | 4/2006 | Achanta | |
| 2006/0109815 A1 | 5/2006 | Ozer et al. | |
| 2007/0248058 A1* | 10/2007 | Fajardo | H04W 24/00 370/338 |
| 2009/0052382 A1 | 2/2009 | Stephenson et al. | |
| 2010/0195595 A1* | 8/2010 | Iwata | H04W 48/16 370/329 |
| 2013/0039181 A1* | 2/2013 | Chao | H04W 48/16 370/235 |

(Continued)

FOREIGN PATENT DOCUMENTS

| | | |
|---|---|---|
| EP | 2184892 A1 | 5/2010 |
| EP | 2680645 A1 | 1/2014 |
| WO | WO-2011019479 A2 | 2/2011 |

OTHER PUBLICATIONS

Sagari S., et al., "Performance Evaluation of Mobile Hotspots in Densely Deployed WLAN Environments," IEEE 24th International Symposium on Personal Indoor and Mobile Radio Communications (PIMRC), 2013, pp. 2935-2939.

(Continued)

*Primary Examiner* — Paul H Masur
(74) *Attorney, Agent, or Firm* — Holland & Hart LLP

(57) ABSTRACT

Methods, systems, and apparatuses are described for adaptive dwell time for scan procedures. A wireless station (STA) may identify a scan period during which a passive scan procedure is performed on a first channel. The STA may analyze a channel congestion metric during at least a portion of the scan period. The STA may transition from the passive scan procedure to an active scan procedure on the first channel during the scan period based at least in part on the analyzed channel congestion metric.

29 Claims, 11 Drawing Sheets

(56) References Cited

U.S. PATENT DOCUMENTS

| | | | |
|---|---|---|---|
| 2013/0252640 A1 | 9/2013 | Kenney et al. | |
| 2014/0010089 A1 | 1/2014 | Cai et al. | |
| 2014/0362420 A1 | 12/2014 | Borges et al. | |
| 2015/0131435 A1* | 5/2015 | Kasslin | H04W 84/12 |
| | | | 370/230 |
| 2015/0156723 A1* | 6/2015 | Locher | H04W 48/16 |
| | | | 370/311 |
| 2015/0351026 A1* | 12/2015 | Lee | H04W 40/244 |
| | | | 370/237 |
| 2016/0262090 A1* | 9/2016 | Marin | H04W 74/0816 |
| 2017/0055200 A1* | 2/2017 | Hassan | H04W 48/14 |

OTHER PUBLICATIONS

ISA/EP, International Search Report and Written Opinion of the International Searching Authority, Int'l Application No. PCT/US2016/048544, dated Jan. 9, 2017, European Patent Office, Rijswijk, NL, 18 pgs.

ISA/EPO, Partial International Search Report of the International Searching Authority, Int'l. App. No. PCT/US2016/048544, dated Nov. 24, 2016, European Patent Office, Rijswijk, NL, 8 pgs.

* cited by examiner

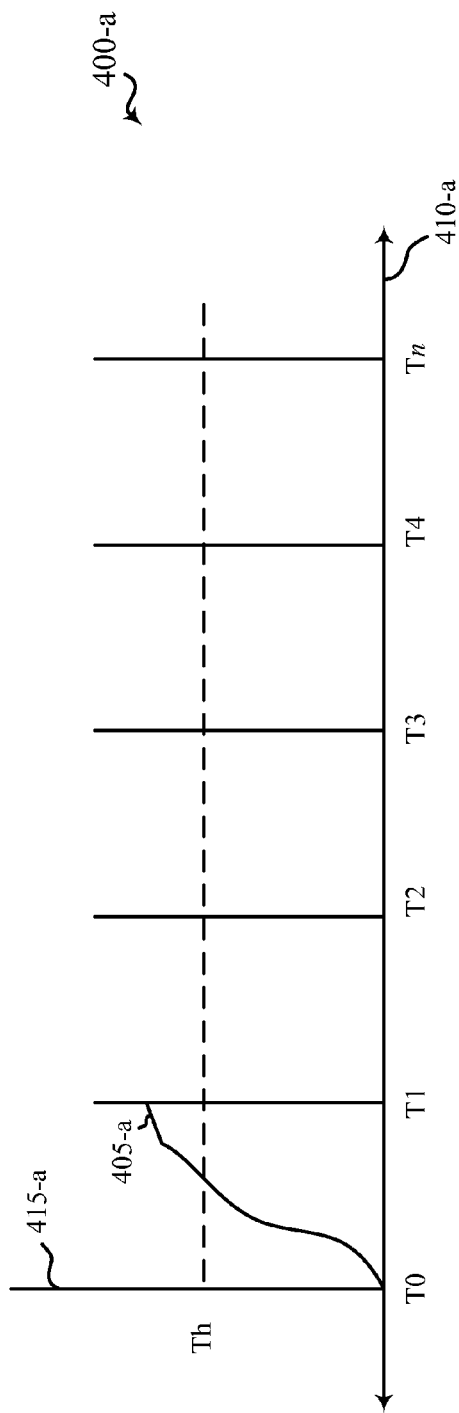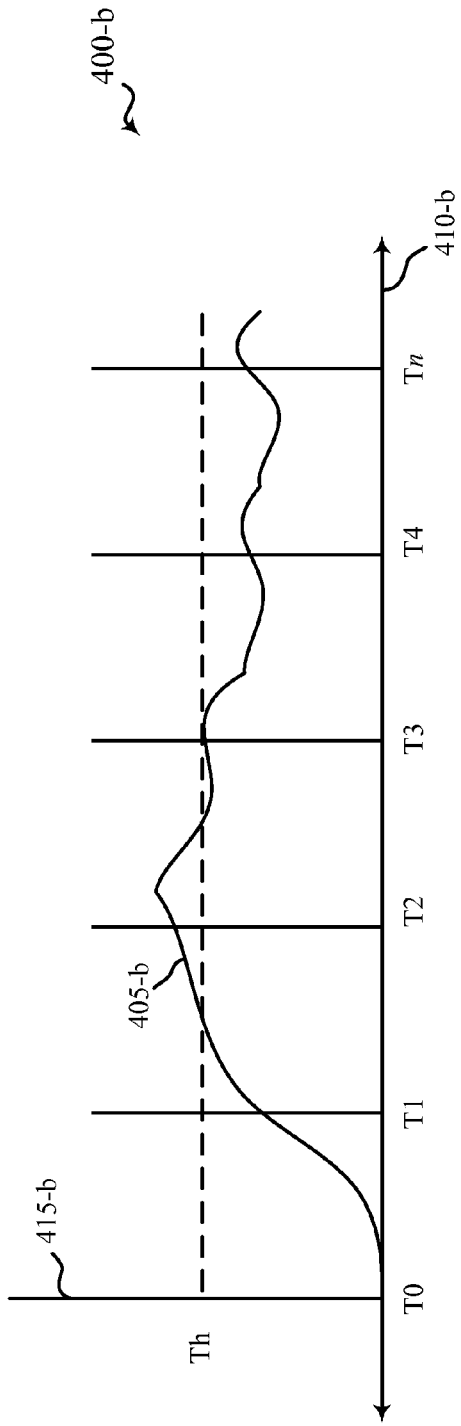

DYNAMIC FREQUENCY SELECTION CHANNEL SCAN OPTIMIZATIONS

BACKGROUND

Field of the Disclosure

The present disclosure relates to wireless communication systems, and more particularly to techniques for dynamic frequency selection channel scan optimizations.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a Wireless Local Area Network (WLAN), such as a Wi-Fi network (IEEE 802.11) may include an access point (AP) that may communicate with at least one stations (STA) or mobile devices. The AP may be coupled to a network, such as the Internet, and enable an access terminal (AT) to communicate via the network (and/or communicate with other devices coupled to the AP).

STAs typically perform scan procedures on channels of a WLAN, e.g., passive and/or active scans. During active scans, the STA actively looks for other devices by broadcasting a probe request and then waiting to see if any devices, e.g., another STA and/or AP, sends a probe response. During passive scans, the STA listens on (or monitors) a channel to detect transmissions, e.g., beacons, probe requests/responses, packets, etc. Passive scans typically include the device listening on the channel for a maximum time period (or dwell time) that may provide for the reception of beacon transmissions from other devices, e.g., the dwell time may be selected to ensure the device is listening for a complete beacon interval. This dwell time, e.g., the time the device is monitoring the channel, may result in unnecessarily long total passive scan times. For example, when listening on the channel, the device typically performs a clear channel assessment (CCA) by detecting energy levels on the channel. If the energy levels rise above a threshold, the device determines whether or not the transmission is a radar signal and, if so, the device adds the channel to a non-occupancy list (NOL) for a time period. These long passive scan times may cause increased power use for the device. Moreover, current protocols do not provide a mechanism for the device to safely determine that a radar signal is not present, and therefore switch from a passive scan to an active scan without waiting for the maximum dwell time.

SUMMARY

The present description generally relates to improved systems, methods, apparatuses, or computer-readable media for wireless communications. More particularly, the described features relate to techniques for an adaptive dwell time for channel scanning that provides for a reduced total scan time and conserves device power. A device, e.g., a station (STA), may evaluate a channel congestion metric during discrete intervals of a scan procedure and, based on the channel congestion metric, decide whether to switch from a passive scan to an active scan on the current channel (e.g., without waiting for the maximum dwell time). For example, the device may initiate the passive scan procedure on the channel and, at the same time, begin to determine (or accumulate information associated with) the channel congestion metric. The channel congestion metric may provide an indication of whether signals are detected on the channel, and in some aspects what type of signals are detected. The channel congestion metric may be determined based on total WLAN congestion, e.g., all detected uplink and downlink Wi-Fi. The device may identify, based on the channel congestion metric, WLAN traffic on the channel during the scan period; and transition to the active scan procedure on the first channel.

A method for wireless communication is described. The method may include: identifying a scan period during which a passive scan procedure is performed on a first channel; analyzing a channel congestion metric during at least a portion of the scan period; and transitioning from the passive scan procedure to an active scan procedure on the first channel during the scan period based at least in part on the analyzed channel congestion metric.

The method may include: identifying, based at least in part on the channel congestion metric, wireless local area network (WLAN) traffic on the first channel, wherein the transition to the active scan procedure is based at least in part on the identified WLAN traffic. The method may include determining, based at least in part on the channel congestion metric, that there is no traffic on the first channel; and transmitting a probe request message on the first channel to transition to the active scan procedure, wherein a duration of the probe request message is an abbreviated duration.

The method may include identifying, based at least in part on the channel congestion metric, wireless local area network (WLAN) traffic on the first channel and a second channel; and initiating the active scan procedure on the second channel based at least in part on the identified WLAN traffic. The method may include: identifying a location metric associated with wireless communications using the first channel; and transitioning to the active scan procedure based at least in part on the location metric. The method may include: analyzing the channel congestion metric over a plurality of intervals of the scan period associated with the passive scan procedure; and transitioning to the active scan procedure based at least in part on a function of the channel congestion metric over the plurality of intervals of the scan period. The function of the channel congestion metric may include a different threshold level of the channel congestion metric for each interval of the plurality of intervals.

The method may include identifying a trend associated with the channel congestion metric over at least some of a plurality of intervals of the scan period, wherein transitioning to the active scan procedure is further based at least in part on the trend associated with the channel congestion metric. The channel congestion metric is based at least in part on a probability associated with a detection of a radar signal on the first channel. The channel congestion metric is based at least in part on at least one of a Wi-Fi communication associated with an apparatus, or a Wi-Fi communications within a basic subscriber set (BSS) associated with the apparatus, or a Wi-Fi communication for a BSS not associated with the apparatus, or a combination thereof.

An apparatus for wireless communication is described. The apparatus may include: a scan timing manager to identify a scan period during which a passive scan procedure is performed on a first channel; a channel congestion metric manager to analyze a channel congestion metric during at least a portion of the scan period; and a scan transition manager to transition from the passive scan procedure to an active scan procedure on the first channel during the scan period based at least in part on the analyzed channel congestion metric.

The channel congestion metric manager is further configured to identify, based at least in part on the channel congestion metric, wireless local area network (WLAN) traffic on the first channel, wherein the transition to the active scan procedure is based at least in part on the identified WLAN traffic. The channel congestion metric manager is further configured to determine, based at least in part on the channel congestion metric, that there is no traffic on the first channel; and wherein the scan transition manager is further configured to transmit a probe request message on the first channel to transition to the active scan procedure, wherein a duration of the probe request message is an abbreviated duration.

The channel congestion metric manager is further configured to identify, based at least in part on the channel congestion metric, wireless local area network (WLAN) traffic on the first channel and a second channel; and wherein the scan transition manager is further configured to initiate the active scan procedure on the second channel based at least in part on the identified WLAN traffic. The channel congestion metric manager is further configured to identify a location metric associated with wireless communications using the first channel; and wherein the scan transition manager is further configured to transition to the active scan procedure based at least in part on the location metric.

The channel congestion metric manager is further configured to analyze the channel congestion metric over a plurality of intervals of the scan period associated with the passive scan procedure; and the scan transition manager is further configured to transition to the active scan procedure based at least in part on a function of the channel congestion metric over the plurality of intervals of the scan period. The function of the channel congestion metric may include a different threshold level of the channel congestion metric for each interval of the plurality of intervals.

The channel congestion metric manager is further configured to identify a trend associated with the channel congestion metric over at least some of a plurality of intervals of the scan period, wherein transitioning to the active scan procedure is further based at least in part on the trend associated with the channel congestion metric. The channel congestion metric is based at least in part on a probability associated with a detection of a radar signal on the first channel. The channel congestion metric is based at least in part on at least one of a Wi-Fi communication associated with the apparatus, or a Wi-Fi communications within a basic subscriber set (BSS) associated with the apparatus, or a Wi-Fi communication for a BSS not associated with the apparatus, or a combination thereof.

An apparatus for wireless communication is described. The apparatus may include: means for identifying a scan period during which a passive scan procedure is performed on a first channel; means for analyzing a channel congestion metric during at least a portion of the scan period; and means for transitioning from the passive scan procedure to an active scan procedure on the first channel during the scan period based at least in part on the analyzed channel congestion metric.

The apparatus may include: means for identifying, based at least in part on the channel congestion metric, wireless local area network (WLAN) traffic on the first channel, wherein the transition to the active scan procedure is based at least in part on the identified WLAN traffic. The apparatus may include: means for determining, based at least in part on the channel congestion metric, that there is no traffic on the first channel; and means for transmitting a probe request message on the first channel to transition to the active scan procedure, wherein a duration of the probe request message is an abbreviated duration.

The apparatus may include: means for identifying, based at least in part on the channel congestion metric, wireless local area network (WLAN) traffic on the first channel and a second channel; and means for initiating the active scan procedure on the second channel based at least in part on the identified WLAN traffic. The apparatus may include: means for identifying a location metric associated with wireless communications using the first channel; and means for transitioning to the active scan procedure based at least in part on the location metric.

The apparatus may include means for analyzing the channel congestion metric over a plurality of intervals of the scan period associated with the passive scan procedure; and means for transitioning to the active scan procedure based at least in part on a function of the channel congestion metric over the plurality of intervals of the scan period. The function of the channel congestion metric may include a different threshold level of the channel congestion metric for each interval of the plurality of intervals. The apparatus may include means for identifying a trend associated with the channel congestion metric over at least some of a plurality of intervals of the scan period, wherein transitioning to the active scan procedure is further based at least in part on the trend associated with the channel congestion metric.

The channel congestion metric is based at least in part on a probability associated with a detection of a radar signal on the first channel. The channel congestion metric is based at least in part on at least one of a Wi-Fi communication associated with the apparatus, or a Wi-Fi communications within a basic subscriber set (BSS) associated with the apparatus, or a Wi-Fi communication for a BSS not associated with the apparatus, or a combination thereof.

A non-transitory computer-readable medium storing computer-executable code for wireless communication is described. The code executable by a processor to: identify a scan period during which a passive scan procedure is performed on a first channel; analyze a channel congestion metric during at least a portion of the scan period; and transition from the passive scan procedure to an active scan procedure on the first channel during the scan period based at least in part on the analyzed channel congestion metric.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 4A and 4B show example timing chart diagrams for congestion adapted passive scan dwell time, in accordance with various aspects of the present disclosure;

DETAILED DESCRIPTION

Figure 1:
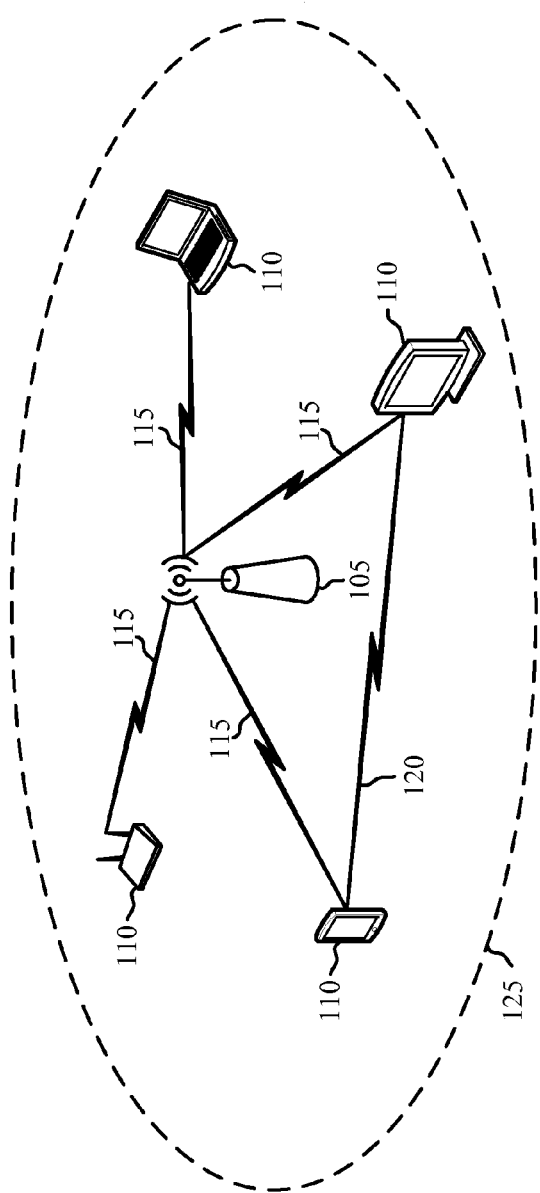
FIG. 1 shows a block diagram of a wireless communication system, in accordance with various aspects of the present disclosure.

The described features generally relate to improved systems, methods, and/or apparatuses for adapting and reducing the passive scan dwell or wait time based on a congestion metric of the channel of a wireless network, such as a wireless local area network (WLAN) or Wi-Fi network. Conventional passive scan techniques provide for a station (STA) to initiate a passive scan procedure on certain channels, such as dynamic frequency selection (DFS) channels that may be associated with radar transmissions. The STA starts the passive scan procedure on a channel and then listens for transmissions from neighboring devices (e.g., other ATs, access points (APs), radar systems, etc.) for a maximum duration (MaxChannelTime parameter), also referred to as a dwell time. The maximum dwell time generally extends beyond a beacon interval to ensure the STA detects any transmitted beacons. The maximum dwell time, however, generally provides for extended scan time delays and unnecessary power consumption by the STA.

The described techniques provide for the STA to use an adaptive dwell time for channel scanning that provides for a reduced total scan time and conserves device power. The STA may evaluate a channel congestion metric during discrete intervals of a scan procedure and, based on the channel congestion metric, decide whether to switch from a passive scan to an active scan during the scan period on the current channel (e.g., without waiting the maximum dwell time). For example, the device may initiate the passive scan procedure on the channel and, at the same time, begin to determine (or accumulate information associated with) the channel congestion metric. The channel congestion metric may provide an indication of whether signals are detected on the channel, and in some aspects what type of signals are detected. The STA may determine, based on the channel congestion metric, whether to transition during the scan period to an active scan procedure on the channel. For example, the STA may detect WLAN traffic on the channel and use this information as an indicator that there is no radar operating on or near the channel. Therefore, the STA may transition to the active scan procedure during the scan period.

In some aspects, the scanning process may be divided into a plurality of intervals. The intervals may be measured from the time the scan procedure is initiated. At a first interval, the STA may determine if the channel congestion metric for a first channel is above or below a threshold, e.g., whether there is any WLAN traffic on the first channel. If the channel congestion metric is above the threshold, this may indicate that there is WLAN traffic (and therefore not likely that a radar in is in the vicinity), and the device may transition to an active scan procedure on the first channel. If the channel congestion metric is below the threshold, e.g., there is no WLAN traffic but there is activity (energy level) on the first channel, this may indicate that a sporadic radar signal has been detected. In response, the device may not transition to the active scan procedure.

In some examples where the congestion metric is below the threshold, the STA may transition to the active scan procedure by sending an abbreviated probe request message. The probe request message may have a short duration and therefore not likely to interfere with any neighboring radar signals. The STA may again utilize aspects of the channel congestion metric during the active scan procedure.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a block diagram illustrates an example of a WLAN network 100 such as, e.g., a network implementing the Institute of Electrical and Electronics Engineers (IEEE) 802.11 family of standards. The WLAN network 100 may include an access point (AP) 105 and at least one wireless devices or STAs 110, such as mobile stations, personal digital assistants (PDAs), other handheld devices, netbooks, notebook computers, tablet computers, laptops, display devices (e.g., TVs, computer monitors, etc.), printers, etc. While only one AP 105 is illustrated, the WLAN network 100 may have multiple APs 105. Each of the STAs 110, which may also be referred to as mobile stations (MSs), mobile devices, wireless stations, user equipment (UE), subscriber stations (SSs), or subscriber units, may associate and communicate with an AP 105 via a communication link 115. Each AP 105 has a geographic coverage area 125 such that STAs 110 within that area can typically communicate with the AP 105. The STAs 110 may be dispersed throughout the geographic coverage area 125. Each STA 110 may be stationary or mobile.

A STA 110 can be covered by more than one AP 105 and can therefore associate with AP(s) 105 at different times. A single AP 105 and an associated set of stations may be referred to as a basic service set (BSS). An extended service set (ESS) is a set of connected BSSs. A distribution system (DS) is used to connect APs 105 in an extended service set. A geographic coverage area 125 for an AP 105 may be divided into sectors making up only a portion of the coverage area. The WLAN network 100 may include APs 105 of different types (e.g., metropolitan area, home network, etc.), with varying sizes of coverage areas and overlapping coverage areas for different technologies. Other wireless devices can communicate with the AP 105.

While the STAs 110 may communicate with each other through the AP 105 using communication links 115, each STA 110 may also communicate directly with other STA(s) 110 via a direct wireless link 120. Two or more STAs 110 may communicate via a direct wireless link 120 when both STAs 110 are in the AP geographic coverage area 125 or when one or neither STA 110 is within the AP geographic coverage area 125. Examples of direct wireless links 120 may include Wi-Fi Direct connections, connections established by using a Wi-Fi Tunneled Direct Link Setup (TDLS) link, and other peer-to-peer (P2P) group connections. The STAs 110 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11 ad, 802.11 ah, etc. In other implementations, other P2P connections and/or ad hoc networks may be implemented within the WLAN network 100.

In certain aspects, STAs 110 may be configured for an adaptive dwell time for channel passive scanning that provides for a reduced total active scan time and conserves STA 110 power. The passive scan procedure generally includes the STA 110 identifying the scan period associated with the passive scan procedure on the channel. During the passive scan procedure, the STA 110 generally listens or monitors the channel for signal detection. Generally, STA 110 may evaluate a channel congestion metric during the scan period of the passive scan procedure and, based on the channel congestion metric, decide whether to transition to an active scan procedure on current channel during the scan period (e.g., without waiting the maximum dwell time). For example, the STA 110 may initiate the passive scan procedure on the channel and, at the same time, begin to determine (or accumulate information associated with) the channel congestion metric. The channel congestion metric may provide an indication of whether a radar system is operating on or near the channel, e.g., in an adjacent channel. In some aspects, the channel congestion metric may be determined based on total congestion of the WLAN network 100, e.g., all detected uplink and downlink Wi-Fi transmissions.

In some examples, the scanning process may be divided into a plurality of intervals. The intervals may be measured from the time the passive scan procedure is started. At a first interval, the STA 110 may determine if the channel congestion metric satisfies a threshold, e.g., is above, at, or below a threshold level. If the channel congestion metric is below the threshold, this may indicate that radar signal transmissions are expected. As a result, the STA 110 may transition to an active scan procedure on the channel by transmitting a probe request message. If the channel congestion metric is above the threshold, however, this may indicate that a radar signal transmission may be expected on the current channel. The STA 110 may continue the passive scan procedure on the current channel during a second interval. At the end of the second interval, the STA 110 may determine if the channel congestion metric is above, at, or below a threshold and continue the passive scan procedure or transition to the active scan procedure on the current channel accordingly.

In some aspects, the channel congestion metric may be determined based on counter(s) that are initialized when the STA 110 initiates the passive scan procedure. The counters may be incremented based on detection of STA 110 Wi-Fi reception(s), STA 110 Wi-Fi transmission(s), all Wi-Fi uplink transmissions within the device basic subscriber set (BSS), all Wi-Fi downlink transmissions within the device BSS, all BSS Wi-Fi traffic transmissions, all other BSS Wi-Fi traffic transmissions, or combinations thereof. Accordingly, false triggers caused by other devices communicating in or near the channel frequency, e.g., Bluetooth, medical devices, ZigBee, etc., may be avoided.

In one example, evaluation of the channel congestion metric may include additional considerations or actions. For example, an abbreviated probe requests may be transmitted at discrete interval(s) of the passive scan procedure based on the channel congestion metric. As another example, evaluation of the channel congestion metric may be performed across multiple intervals to establish a trend, e.g., an average, a rising trend, a falling trend, etc., for the channel congestion metric. Evaluation of the channel congestion metric may be stopped, in some examples, after a certain number of intervals and the STA 110 may wait the maximum dwell time for scan procedure on the channel. Thus, STAs 110 may adapt the dwell time for passive channel scanning procedures based on the indication of whether a radar signal transmission is expected, and STAs 110 can avoid maximum dwell times on channels where sufficient Wi-Fi transmissions are present, for example. This may reduce the total scan time and conserve STA 110 power.

Figure 2:
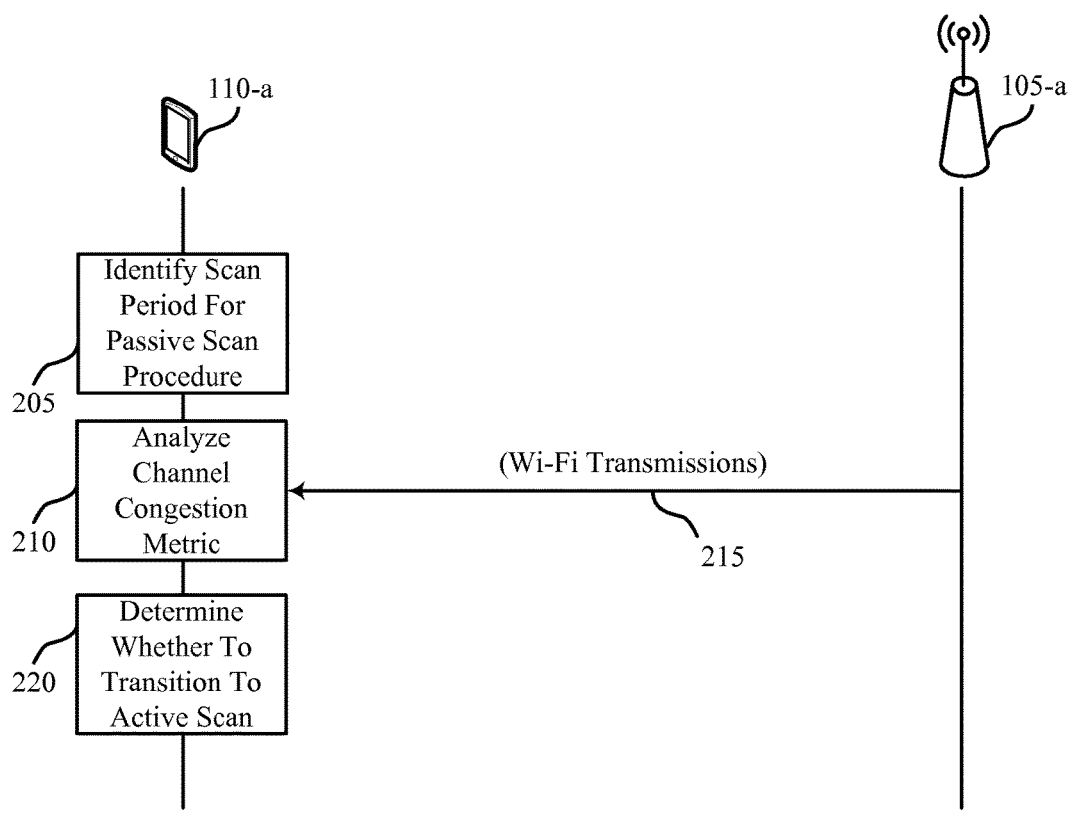
FIG. 2 shows an example diagram of aspects of communications using congestion adapted passive scan dwell time for use in wireless communication, in accordance with various aspects of the present disclosure.

FIG. 2 shows an example diagram 200 of aspects of communications using congestion adapted passive scan dwell time for use in wireless communication, in accordance with various aspects of the present disclosure. Diagram 200 illustrates communications between a STA 110-a and an AP 105-a. STA 110-a may be an example of aspects of a STA 110 described with reference to FIG. 1. AP 105-a may be an example of aspects of an AP 105 described with reference to FIG. 1. In some examples, STA 110-a may include a processing system and an interface configured to perform the described functions.

Broadly, in some aspects STA 110-a may operate in a slave mode and be configured for radar signal detection. The STA 110-a may maintain a list of blacklisted channels, e.g., the NOL of channels in which a radar signal transmission has been detected. The STA 110-a may maintain a time of re-entering the blacklisted channels based on the time since the last Wi-Fi transmission on the first channel and/or since the last radar signal transmission was detected. If the first channel is part of the blacklisted channels, the STA 110-a may determine if the time of re-entry for the channel is below a first threshold period and, if so, refrain from initiating a scan procedure on the first channel (active and/or passive scan procedure). If the time of re-entry is between the first threshold period and a second threshold period, the STA 110-a may perform a passive scan procedure on the channel that includes waiting the maximum dwell time or until a radar signal is detected. If the time of re-entry is greater than a second threshold, the STA 110-*a* may initiate the presently described adaptive dwell techniques for a passive scan procedure.

At 205, STA 110-*a* may identify a scan period for a passive scan procedure on a channel (e.g., a first channel) of a wireless communication system, such as WLAN network 100 described with reference to FIG. 1. For example, the STA 110-*a* may divide the scan period into discrete intervals or time slots. The first interval may begin with an initiation of the passive scan procedure. As one non-limiting example, a scan period may range between 20-80 milliseconds (ms) per channel and may be divided into 2, 3, 4, 5, or some other number of discrete intervals during the scan period. Accordingly, the intervals may provide for a quicker and/or more opportunities to determine the feasibility of continuing the passive scan procedure on the current channel versus transitioning to an active scan procedure during the scan period on the channel.

At 210, the STA 110-*a* may analyze a channel congestion metric during the scan period. The channel congestion metric may be based, for example, on Wi-Fi transmissions 215 received from AP 105-*a*, as well as transmissions from other APs. Generally, the channel congestion metric may provide an indication of the likelihood of detecting a radar signal transmission on the channel. The STA 110-*a* may collect information or data (e.g., initiate counter(s)) associated with the channel congestion metric upon starting the passive scan procedure and during the discrete intervals of the scan period. In some aspects, a higher channel congestion metric may indicate that there is substantial Wi-Fi traffic on the channel and therefore not likely to have any radar signal transmissions. Consequently, the STA 110-*a* may determine that the passive scan procedure is not necessary and transition to an active scan procedure by transmitting a probe request message. As discussed above, the channel congestion metric may indicate that there is radar signal transmission on the channel and therefore the STA 110-*a* may not transition to the active scan procedure. Instead, the STA 110-*a* may add the channel to the NOL for a time period and exit the passive scan procedure on the first channel.

The channel congestion metric may provide a representation of the Wi-Fi traffic on the channel that is more reliable than the raw signal strength measurements associated with the traditional clear channel assessment (CCA) procedures. For example, the channel congestion metric may include a measurement, or count, of the total Wi-Fi congestion on the channel, e.g., all Wi-Fi traffic to/from the STA 110-*a* as well as all other uplink and downlink Wi-Fi traffic observed, or monitored, by the STA 110-*a*. In another example, the channel congestion metric may include a measurement, or count, of all uplink Wi-Fi traffic observed, or monitored, by the STA 110-*a*. In another example, the channel congestion metric may include a measurement, or count, of all downlink traffic observed, or monitored, by the STA 110-*a*. In another example, the channel congestion metric may include a measurement, or count, of all Wi-Fi traffic measured, or observed, by the STA 110-*a* that is associated with the BSS of the STA 110-*a*. In yet another example, the channel congestion metric may include a measurement, or count, of all Wi-Fi traffic measured, or observed, by the STA 110-*a* from BSS(s) other than the BSS of the STA 110-*a*. In some example, the channel congestion metric may include aspects of some or all the above-described measured, or observed, Wi-Fi traffic by the STA 110-*a*. The STA 110-*a* may decode monitored frame(s) to distinguish between a Wi-Fi signal and some other signal present in the channel (e.g., a Bluetooth signal, a micro-wave signal, a medical device signal, and the like).

Aspects of the channel congestion metric may be determined (or computed) based on reception of wideband Wi-Fi traffic. For example, the STA 110-*a* may perform a passive scan procedure on the channel and detect Wi-Fi traffic. The STA 110-*a* may determine that at least some of the detected Wi-Fi traffic is wideband traffic (e.g., by decoding portions of a Wi-Fi preamble of the Wi-Fi traffic). The wideband traffic generally includes traffic transmitted across the current channel and a number of other channels, depending on the bandwidth, e.g., 40 MHz, 80 MHz, 160 MHz, etc. Based on detecting and identifying the channels used for the wideband Wi-Fi traffic, the STA 110-*a* may determine the channel congestion metric for the current channel and for the other channels used for the wideband traffic. In some examples where the STA 110-*a* detects wideband Wi-Fi traffic, the STA 110-*a* may perform parallel scan procedures on the channels used for the wideband traffic.

In some aspects, the channel congestion metric may indicate that there is some signal detected on the first channel, but no detected Wi-Fi traffic. For example, the passive scan procedure may detect energy in the industrial, scientific, medical (ISM) band of the channel. The origin of the energy detected in the ISM band may be unknown, e.g., may not be decodable. In this situation, the STA 110-*a* may not transition to the active scan procedure during the scan period but instead may wait the maximum dwell time or until a radar signal transmission is confirmed.

In some aspects, the channel congestion metric may indicate that there is no energy detected on the channel, e.g., no Wi-Fi traffic and no ISM band energy. In this situation, the STA 110-*a* may continue the passive scan procedure on the channel during a second interval. In other examples, the STA 110-*a* may transition to the active scan procedure during the scan period on the channel by transmitting an abbreviated probe request message. The duration of the abbreviated probe request message may be selected to avoid or minimize any interference with a radar system that might be operating on the first channel, e.g., may have a duration of less than 1 millisecond.

In some aspects, the channel congestion metric may also be based on a location metric associated with the STA 110-*a*. For example, the STA 110-*a* may store and/or access information associated with its current location as well as the locations of known radar systems operating in the area. When there are no known radar systems operating in the area of the STA 110-*a*, the STA 110-*a* may transition to the active scan procedure during the scan period on the first channel, e.g., without waiting the maximum dwell time. In some examples, the location metric may also be based on which channel is being scanned. For example, some radar systems are known to operate in particular channels. Thus, the channel congestion metric may be based on such known information and the dwell time for the passive scan procedure may be adapted accordingly.

In some aspects, the channel congestion metric may be based on background passive scanning to enable active scanning across other channels associated with a radar signal transmission. For example, the STA 110-*a* may passively scan channels using a bandwidth mode set to wideband, e.g., 80 MHz or 160 MHz. For known wideband radar signal transmissions, the channel congestion metric from the passive scan procedure may be applied to the other wideband channels, e.g., skip scans on channels where radar signal transmissions have been detected or transition directly to an active scan procedure where no radar signal transmissions have been detected. Aging techniques may be applied to the stored listing of channels.

In some aspects, the channel congestion metric may also be based on a history of previous scan procedures performed on the channels. For example, the historical information for a channel may be stored for a given time period and then deleted once it ages.

At 220, the STA 110-a may determine whether to transition from the passive scan procedure to an active scan procedure during the scan period on the first channel based on the channel congestion metric. For example, the STA 110-a may compare the channel congestion metric to a threshold value to determine whether to transition to the active scan procedure on the first channel. If the channel congestion metric satisfies the threshold, e.g., is below the threshold, the STA 110-a may not transition to the active scan procedure on the first channel and, assuming there are additional channel(s) to be scanned, initiate a scan procedure on a second channel by sending a probe request on the second channel. If the channel congestion metric does not satisfy the threshold, the STA 110-a may transition to the active scan procedure on the first channel and transition or advance to the next interval. The STA 110-a may continue to determine the channel congestion metric (e.g., continue to collect data associated with congestion on the channel) during the next interval. At the end of the next (or second) interval, the STA 110-a may compare the channel congestion metric to the threshold (the same threshold as used at the conclusion of the first interval or a different threshold) to determine whether to exit the scan procedure on the first channel.

The STA 110-a may determine that the channel congestion metric has satisfied the threshold for more than one interval before determining whether to transition to the active scan procedure on the first channel. For example, the STA 110-a may analyze the channel congestion metric over a predefined number of intervals to identify, or determine, a trend associated with the channel congestion metric. Analyzing the channel congestion metric over multiple intervals may provide an increased confidence level with respect to the expectancy of a probe response being received.

Some aspects may include the STA 110-a sending an abbreviated probe requests at the interval(s) of the scan period. For example, the channel congestion metric may be below the threshold and yet the STA 110-a may detect signals on the first channel. The STA 110-a may transmit an abbreviated or shortened probe request message on the first channel to determine whether there are any non-active APs (e.g., AP 105-a) operating on the channel, but not actively communicating. The abbreviated probe request message may have a duration selected to refrain from interfering with any radar signal transmission, if present on the first channel.

In some aspects, the STA 110-a may smooth the channel congestion metric across multiple intervals using an infinite impulse response (IIR) filter, for example. The STA 110-a may identify a number of intervals after which the scan procedure will automatically wait the maximum dwell time before starting another passive scan procedure on the next channel.

The STA 110-a may have multiple thresholds for different intervals. As one example, the STA 110-a may maintain a lookup table associating threshold level(s) with different intervals (e.g., different threshold levels based on the time since the passive scan procedure was started). For each interval, the STA 110-a may compare the channel congestion metric to the threshold associated with the interval. After a given number of intervals (and associated channel congestion metric comparisons), the STA 110-a may determine whether the dwell time may be stopped and transition to the active scan procedure on the first channel.

Figure 3:
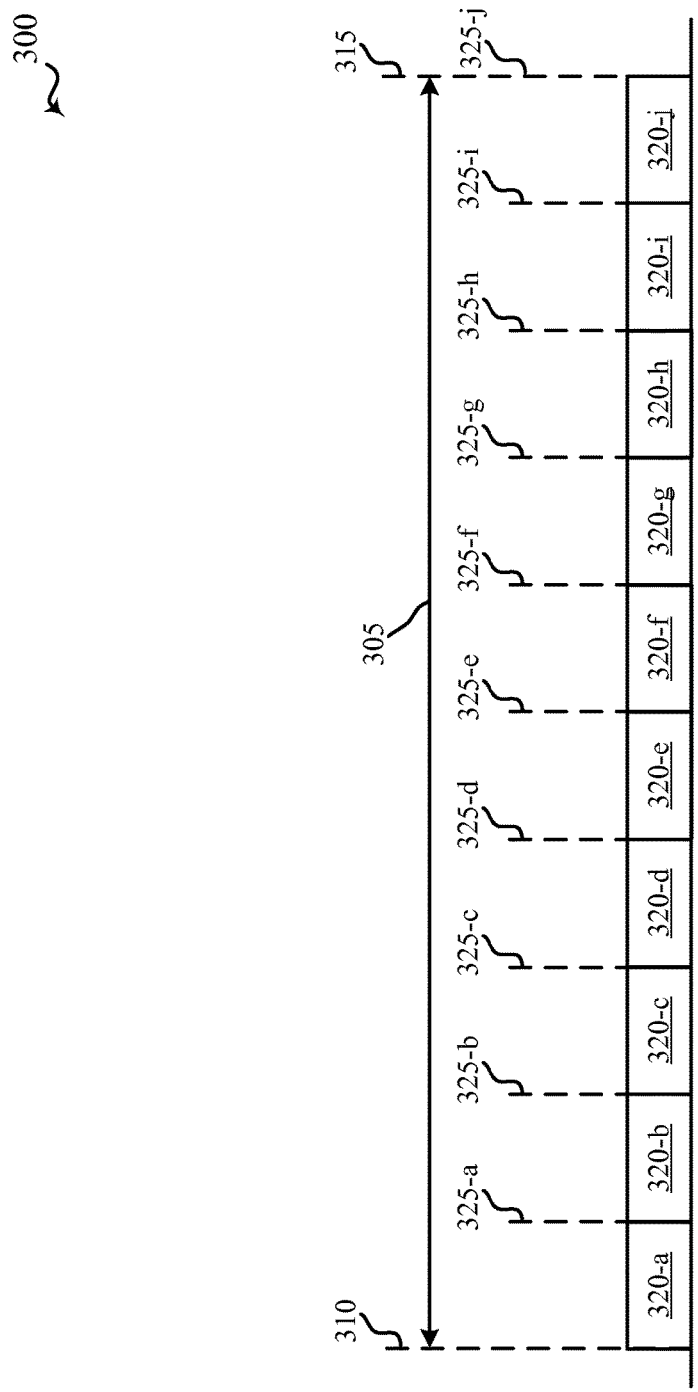
FIG. 3 shows an example timing diagram for congestion adapted passive scan dwell time, in accordance with various aspects of the present disclosure.

FIG. 3 shows a timing diagram 300 illustrating various timing aspects of the present disclosure. The timing diagram 300 may be implemented by aspects of the STAs 110 describes with reference to FIGS. 1 and/or 2.

The timing diagram 300 illustrates a sample scan period 305 defined as the time between start time 310 and end time 315. Start time 310 may correspond to the time when a STA 110 starts a passive scan procedure on the channel. The sample scan period 305 may be divided into a plurality of intervals 320. Although 10 intervals 320 are shown in timing diagram 300, it is to be understood that the sample scan period 305 may be divided into fewer intervals 320 or more intervals 320.

A STA 110 may initiate a passive scan procedure at start time 310 on a channel (e.g., a first channel). The passive scan procedure may include the STA 110 monitoring for energy detected on the channel and/or reception of Wi-Fi traffic. STA 110 may begin to measure the channel congestion metric on the channel at start time 310. The STA 110 may begin to accumulate data associated with the channel congestion metric. For example, the STA 110 may initiate counter(s) that measure and record the amount of Wi-Fi transmissions measured, or observed, by STA 110, as described above.

After each interval 320, at time 325, the STA 110 may evaluate the dwell time and determine whether to continue the passive scan procedure on the channel or transition to an active scan procedure on the first channel. For example, the STA 110 may accumulate the channel congestion metric information during interval 320-a and determine whether to transition to an active scan procedure at time 325-a. STA 110 may compare the measured channel congestion metric with a threshold to determine whether to transition to continue the passive scan procedure into the next interval, e.g., interval 320-b, and evaluate the channel congestion metric again at the conclusion of interval 320-b, at time 325-b.

The STA 110 may determine whether to transition to the active scan procedure during the scan period by smoothing the channel congestion metric across multiple intervals 320, e.g., by averaging the channel congestion metric across the multiple intervals or by applying a filter to the channel congestion metric.

The STA 110 may decide whether to transition to an active scan procedure on the first channel based on the comparison of the channel congestion metric with a threshold at time 325. If the channel congestion metric is at or below the threshold, this may indicate that the channel is not congested (e.g., that there is no Wi-Fi traffic on the channel). This may indicate that the dwell time may be extended and that the STA 110 may continue the passive scan procedure on the first channel. Conversely, if the channel congestion metric is above the threshold, this may indicate that the first channel is congested (e.g., has Wi-Fi traffic). Therefore, the dwell time may be shortened and the STA 110 may transition to the active scan procedure during the scan period 305.

The STA 110 may implement the described functions to adapt the dwell time dependent upon the channel congestion metric to allow, when congested, quicker determination to transition to an active scan procedure when there is Wi-Fi traffic on the first channel. Conversely, the STA 110 may extend the passive scan procedure on the channel when the channel congestion metric indicates that there is little or no Wi-Fi traffic on the channel.

FIGS. 4A and 4B illustrate example timing chart diagrams 400 for congestion adapted passive scan dwell time, in accordance with various aspects of the present disclosure. The timing chart diagrams 400 may be implemented by aspects of the STAs 110 described with reference to FIGS. 1-3.

Referring first to FIG. 4A, diagram 400-*a* is a chart that shows one example of a channel congestion metric 405-*a* plotted along a time axis 410-*a* and a threshold value axis 415-*a*. At time T0, a STA 110 may initiate the passive scan procedure on a channel (e.g., a first channel). The STA 110 may begin to accumulate the channel congestion metric 405-*a* at time T0, by initiating counter(s) at time T0. For example, the STA 110 may have a counter associated with Wi-Fi downlink transmissions of the STA 110, with Wi-Fi uplink transmissions of the STA 110, with all Wi-Fi transmissions occurring on the BSS of the STA 110, with all Wi-Fi transmissions occurring on BSSs other than the STA 110 BSS, etc. The channel congestion metric 405-*a* may be a function of the counter(s), e.g., a total value, a time-weighted average value, a rate of change of the channel congestion metric 405-*a*, etc.

At time T1, the STA 110 may evaluate the channel congestion metric 405-*a* to determine whether to continue the passive scan procedure on the channel or to transition to an active scan procedure on the channel. The STA 110 may evaluate the channel congestion metric 405-*a* by comparing it to a threshold level (Th) to determine whether the channel congestion metric satisfies the threshold. In the example diagram 400-*a*, at time T1 the channel congestion metric 405-*a* is above the threshold level. This may indicate that the channel is congested with Wi-Fi traffic, and that there is a reduced chance that a radar system is operating on the channel. As a result, the STA 110 may transition to the active scan procedure on the channel. As shown in diagram 400-*a*, the STA 110 may avoid unnecessary delay time performing the passive scan procedure on the channel based on the channel congestion metric indicating that the channel is congested with Wi-Fi traffic and, therefore, reduce the total active scan time.

Referring next to FIG. 4B, diagram 400-*b* is a chart that shows one example of a channel congestion metric 405-*b* plotted along a time axis 410-*b* and a threshold value axis 415-*b*. At time T0, a STA 110 may start the passive scan procedure on a channel (e.g., a first channel). The STA 110 may begin to accumulate the channel congestion metric 405-*b* at time T0. For example, counter(s) may be initiated at time T0 to begin the accumulation of the channel congestion metric 405-*b*. The channel congestion metric 405-*b* may be a function of the counter(s), e.g., a total value, a time-weighted average value, etc.

At time T1, the STA 110 may compare the channel congestion metric 405-*b* to the threshold value (Th) to determine whether to transition to an active scan procedure on the channel. As shown in diagram 400-*b*, the channel congestion metric 405-*b* is below the threshold value at time T1. In some aspects, the STA 110 may continue the scan procedure for multiple intervals before making the decision whether to exit the current channel, e.g., the STA 110 may identify a trend associated with the channel congestion metric 405-*b*. In the example diagram 400-*b*, at time T2, the channel congestion metric 405-*b* is above the threshold level. At times T3-Tn, wherein n is a positive integer and may be configurable, the channel congestion metric 405-*b* is below the threshold level. Accordingly, the STA 110 may determine that the channel congestion metric 405-*b* is below the threshold level for a number of intervals and determine to continue the passive scan procedure on the current channel for the maximum scan period, e.g., the STA 110 may determine that the channel congestion metric 405-*b* is on a downward trend.

Thus, diagrams 400-*a* and 400-*b* illustrate examples of a STA 110 evaluating a channel congestion metric, or a function thereof, to determine whether to transition from a passive scan procedure to an active scan procedure on the current channel.

Figure 5:
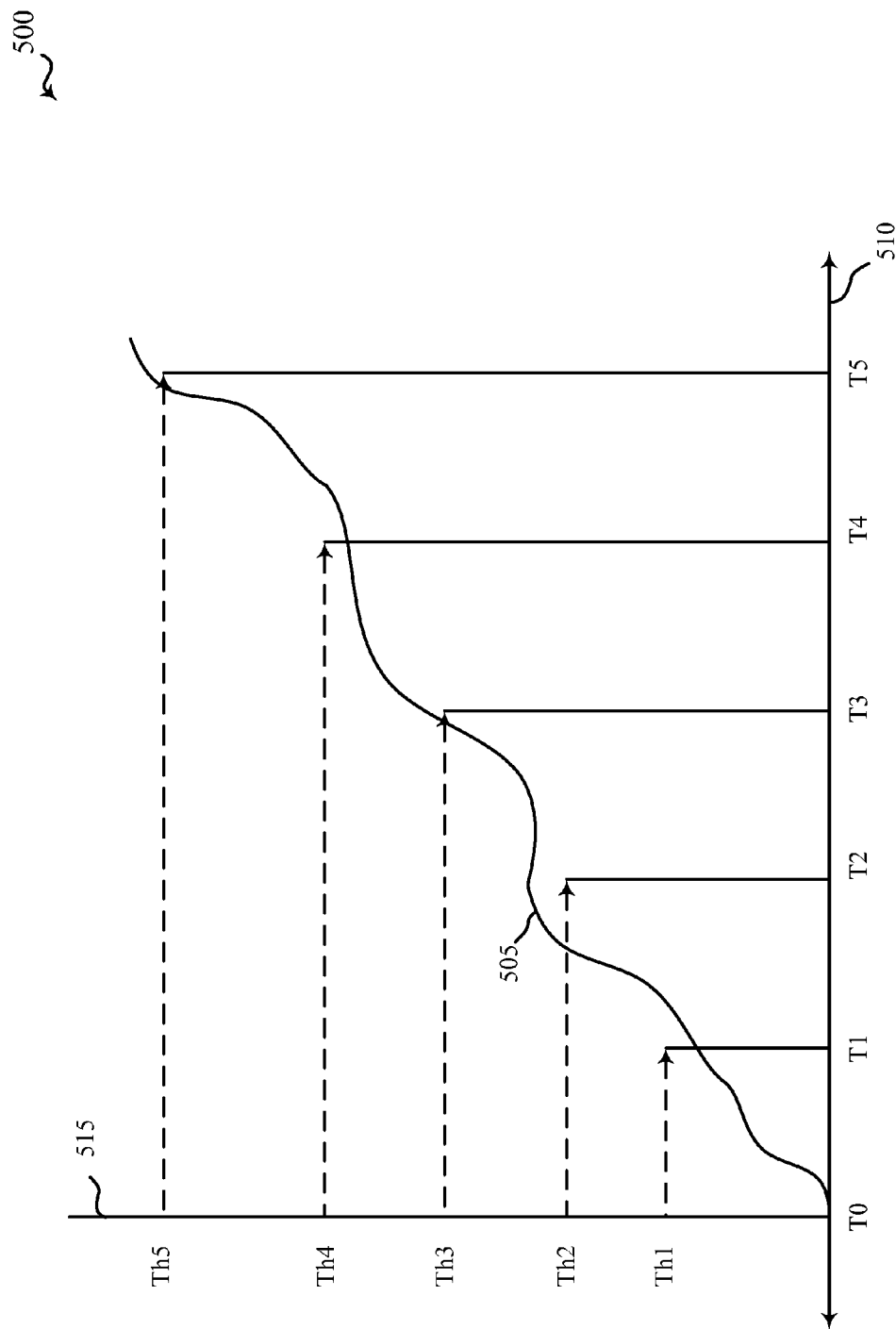
FIG. 5 shows an example timing chart diagram for congestion adapted passive scan dwell time, in accordance with various aspects of the present disclosure.

FIG. 5 shows an example timing chart diagram 500 for congestion adapted passive scan dwell time, in accordance with various aspects of the present disclosure. Aspects of the timing chart diagrams 500 may be implemented by aspects of the STAs 110 described with reference to FIGS. 1-3.

Diagram 500 is a chart that shows one example of a channel congestion metric 505 plotted along a time axis 510 and a threshold value axis 515. At time T0, a STA 110 may start a passive scan procedure on a channel (e.g., a first channel). The STA 110 may begin to accumulate the channel congestion metric 505 at time T0 by initiating counter(s) at time T0. In the example of diagram 500, the channel congestion metric 505 may be a cumulative value based on the output of the counter(s), e.g., a total value or raw count value of the counter(s) recording Wi-Fi transmissions, detected energy levels, etc.

In the example diagram 500, the STA 110 may use different threshold levels (e.g., Th1-Th5) to compare to the channel congestion metric 505 during different intervals. For example, threshold level Th1 may be used to evaluate the channel congestion metric 505 at time T1, threshold level Th2 may be used to evaluate the channel congestion metric 505 at time T2, and so on. The channel congestion metric 505 generally increases (e.g., the counter values continue to increment) once the passive scan procedure is started at time T0, but may fluctuate around the respective threshold level over time. For example, the channel congestion metric 505 is below threshold Th1 at time T1, is above thresholds Th2 and Th3 at times T2 and T3, respectively, is below threshold Th4 at time T4, and above threshold Th5 at time T5.

The STA 110 may determine whether to transition to the active scan procedure on the first channel based on the channel congestion metric 505. For example, the STA 110 may compare the channel congestion metric 505 at each interval to its associated threshold level to determine whether to transition to the active scan procedure. As described above, the STA 110 may identify a trend (or lack of a trend) to make the determination, may determine that the channel congestion metric 505 has satisfied (or not satisfied) the threshold level for a certain number of intervals, etc. The channel congestion metric 505 may provide an indication of the likelihood of (or opportunity for) radar signal transmissions on the channel and the STA 110 may continue the passive scan procedure or transition to the active scan procedure accordingly.

Figure 6:
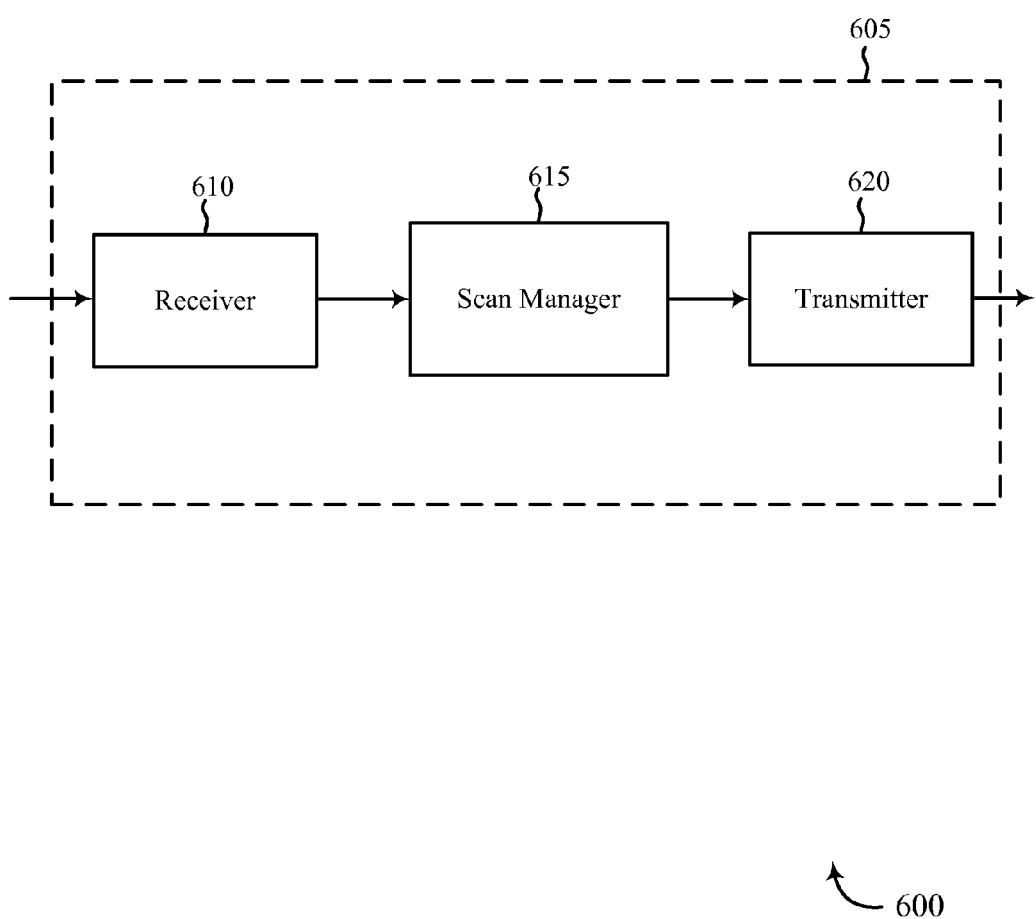
FIG. 6 shows a block diagram of a device configured for use in wireless communication, in accordance with various aspects of the present disclosure.

FIG. 6 shows a block diagram 600 of an apparatus 605 for use in a wireless station for wireless communication, in accordance with various aspects of the present disclosure. In some examples, the apparatus 605 may be an example of aspects of the STAs 110 described with reference to FIGS. 1-5. The apparatus 605 may also be or include a processor. The apparatus 605 may include a receiver 610, a scan manager 615, and/or a transmitter 620. Each of these components of the apparatus 605 may be in communication with each other. In some aspects, the apparatus 605 may be a STA 110 configured to perform the described functions. In other aspects, the apparatus 605 may be a component of a STA 110 (e.g., a chip or module of a STA 110) configured to perform the described functions.

The apparatus 605, through the receiver 610, the scan manager 615, and/or the transmitter 620, may be configured to perform the functions described herein. For example, the apparatus 605 may be configured for an adaptive dwell time for channel scanning that provides for a reduced total active scan time and conserves the power of the apparatus 605.

The components of the apparatus 605 may, individually or collectively, be implemented using application-specific integrated circuits (ASICs) adapted to perform some or all of the applicable functions in hardware. Alternatively, the functions may be performed by other processing units (or cores), on integrated circuits. In other examples, other types of integrated circuits may be used (e.g., Structured/Platform ASICs, field-programmable gate arrays (FPGAs), and other Semi-Custom ICs), which may be programmed in any manner known in the art. The functions of each component may also be implemented, in whole or in part, with instructions embodied in a memory, formatted to be executed by general or application-specific processors.

The receiver 610 may receive information such as packets, user data, and/or control information associated with various information channels (e.g., control channels, data channels, etc.). The receiver 610 may be configured to receive signals associated with a scan procedure on a channel, e.g., Wi-Fi traffic, radar signal transmissions, etc. Information may be passed on to the scan manager 615, and to other components of the apparatus 605.

The scan manager 615 may monitor, control, provide a means for, or otherwise manage aspects of adaptive dwell time for channel scan procedures for the apparatus 605. For example, the scan manager 615 may identify a scan period during which a passive scan procedure is performed on a first channel. The scan manager 615 may analyze a channel congestion metric during the scan period and transition, based on the channel congestion metric, to transition from the passive scan procedure to an active scan procedure on the first channel.

The transmitter 620 may transmit the signal(s) received from other components of the apparatus 605. The transmitter 620 may transmit signals associated with a scan procedure, e.g., probe request message(s). In some examples, the transmitter 620 may be collocated with the receiver 610 in a transceiver. The transmitter 620 may include a single antenna, or it may include a plurality of antennas. In some aspects, the receiver 610 and/or the transmitter 620 may perform the functions of an interface for the apparatus 605.

Figure 7:
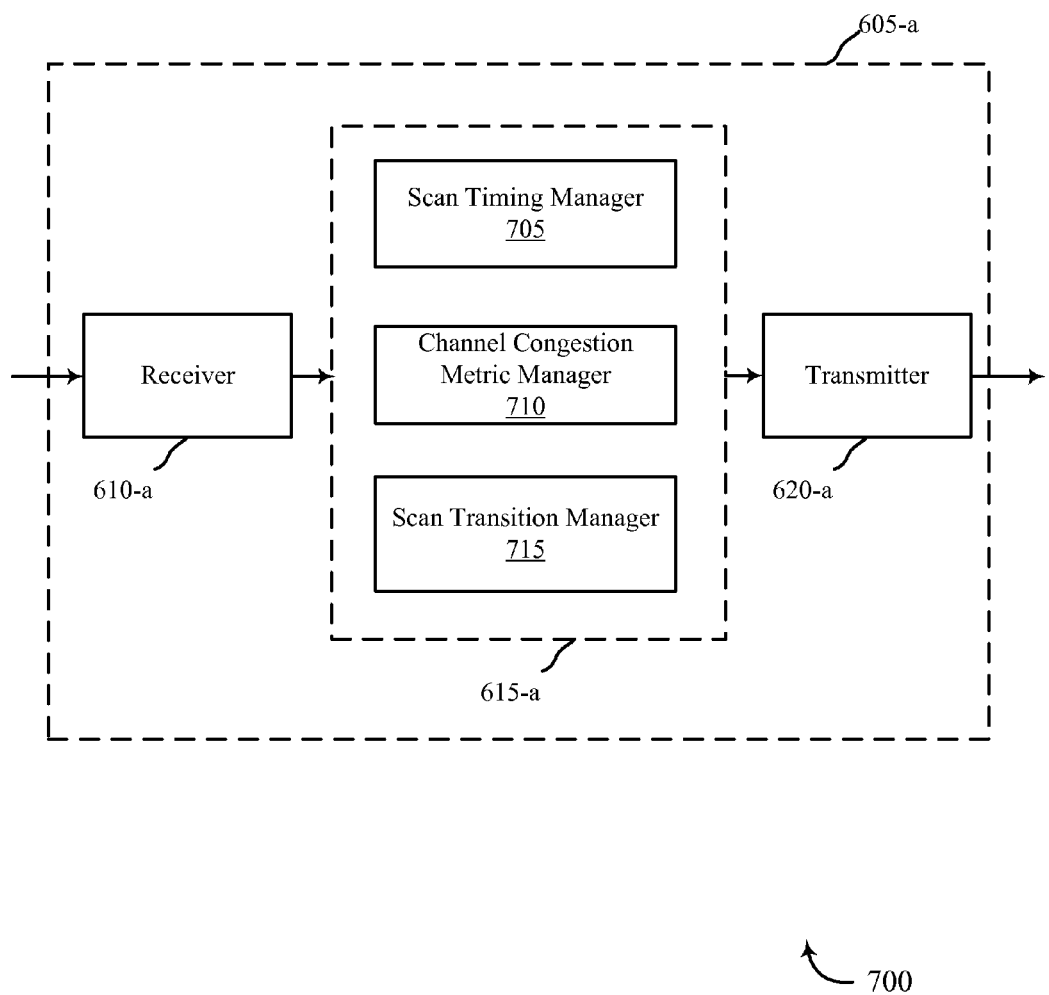
FIG. 7 shows a block diagram of a device configured for use in wireless communication, in accordance with various aspects of the present disclosure.

FIG. 7 shows a block diagram 700 of an apparatus 605-a that is used in a wireless station for wireless communication, in accordance with various examples. The apparatus 605-a may be an example of aspects of a STA 110 described with reference to FIGS. 1-5. It may also be an example of an apparatus 605 described with reference to FIG. 6. The apparatus 605-a may include a receiver 610-a, a scan manager 615-a, and/or a transmitter 620-a, which may be examples of the corresponding components of apparatus 605. The apparatus 605-a may also include a processor. Each of these components may be in communication with each other. The scan manager 615-a may include a scan timing manager 705, a channel congestion metric manager 710, and a scan transition manager 715. The receiver 610-a and the transmitter 620-a may perform the functions of the receiver 610 and the transmitter 620, of FIG. 6, respectively.

The apparatus 605-a may be a STA configured to perform the described functions. In other aspects, the apparatus 605-a may be a component of a STA (e.g., a chip or component of a STA) configured to perform the described functions. For example, the receiver 610-a and/or the transmitter 620-a may perform the functions of an interface for the apparatus 605-a. The scan manager 615-a, or sub-component(s) of the scan manager 615-a, may perform the functions of a processing system for the apparatus 605-a.

The scan timing manager 705 may monitor, control, provide a means for, or otherwise manage timing aspects of a scan procedure for the apparatus 605-a. For example, the scan timing manager 705 may identify a scan period during which a passive scan procedure is performed on a first channel. The scan timing manager 705 may identify a plurality of intervals of the scan period. The plurality of intervals may provide more opportunities for channel congestion metric review, as is described below.

The channel congestion metric manager 710 may monitor, control, provide a means for, or otherwise manage aspects of a channel congestion metric for the apparatus 605-a. For example, the channel congestion metric manager 710 may analyze a channel congestion metric during at least a portion of the scan period. The channel congestion metric manager 710 may identify WLAN traffic on the first channel based on the channel congestion metric. The channel congestion metric manager 710 may determine that there is no traffic on the first channel. The channel congestion metric manager 710 may determine that there is WLAN traffic on the first channel and a second channel. The channel congestion metric manager 710 may identify a location metric associated with wireless communications using the first channel.

The channel congestion metric may be based in part on a probability associated with the detection of a radar signal on the first channel. The channel congestion metric may be based on Wi-Fi communications associated with the apparatus (e.g., the STA), Wi-Fi uplink transmissions within a basic subscriber set (BSS) associated with the apparatus, Wi-Fi downlink transmissions within the BSS associated with the apparatus, all Wi-Fi communications within the BSS associated with the apparatus, or Wi-Fi communications for a BSS not associated with the apparatus.

The channel congestion metric manager 710 may analyze the channel congestion metric over a plurality of intervals of the scan period. The channel congestion metric manager 710 may use different threshold levels of the channel congestion metric for each interval of the plurality of intervals, for example. The channel congestion metric manager 710 may identify a trend associated with the channel congestion metric over at least some of the plurality of intervals of the scan period.

The scan transition manager 715 may monitor, control, provide a means for, or otherwise manage aspects of transitioning a scan procedure on a channel for the apparatus 605-a. For example, the scan transition manager 715 may transition from the passive scan procedure to an active scan procedure on the first channel during the scan period based on the analyzed channel congestion metric. The scan transition manager 715 may transition to the active scan procedure based on the identification of WLAN traffic on the channel. The scan transition manager 715 may transmit a probe request message on the first channel to transition to the active scan procedure based on a determination that there is no traffic on the first channel. The probe request may have a duration that is an abbreviated duration.

The scan transition manager 715 may initiate an active scan procedure on a second channel based on an identification of WLAN traffic on the first channel and the second channel. The scan transition manager 715 may transition to an active scan procedure based on an identified location metric associated with wireless communications using the first channel. The scan transition manager 715 may transition to an active scan procedure based on a function of the channel congestion metric analyzed over a plurality of intervals of the scan period. The function may include a different threshold level for each interval of the plurality of intervals.

Thus, the scan timing manager 705, the channel congestion metric manager 710, and the scan transition manager 715 may, alone or in combination or in cooperation with other components (e.g., a processing system), provide a means for performing the aspects of the present disclosure. For example, the scan timing manager 705 may provide a means for identifying a scan period during which a passive scan procedure is performed on a first channel. The channel congestion metric manager 710 may provide a means for analyzing a channel congestion metric during at least a portion of the scan period. The scan transition manager 715 may provide a means for transitioning from the passive scan procedure to an active scan procedure on the first channel during the scan period based on the analyzed channel congestion metric.

Figure 8:
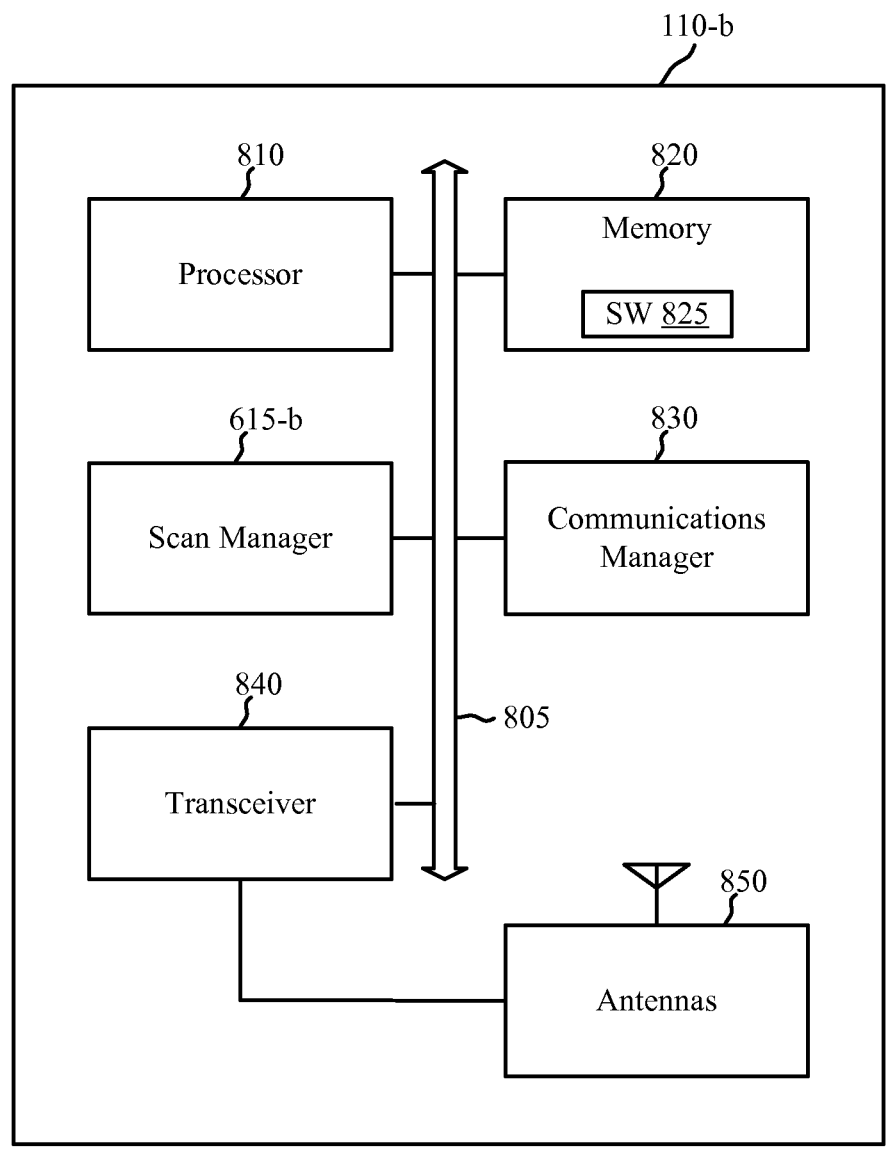
FIG. 8 shows a block diagram of an access terminal for use in wireless communication, in accordance with various aspects of the present disclosure.

Turning to FIG. 8, a block diagram 800 is shown that illustrates a STA 110-*b* configured for adaptive dwell time for channel scanning that provides for a reduced total passive scan time and conserves power of the STA 110-*b*. The STA 110-*b* may have various other configurations and may be included or be part of a personal computer (e.g., laptop computer, netbook computer, tablet computer, etc.), a cellular telephone, a PDA, a digital video recorder (DVR), an internet appliance, a gaming console, an e-reader, etc. The STA 110-*b* may have an internal power supply, such as a small battery, to facilitate mobile operation. The STA 110-*b* may be an example of the STAs 110 described with reference to FIGS. 1-3, and the apparatus 605 described with reference to FIGS. 6-7.

The STA 110-*b* may include a processor 810, a memory 820, a transceiver 840, antennas 850, and a scan manager 615-*b*. The scan manager 615-*b* may be an example of the scan manager 615 of FIGS. 6 and 7. Each of these components may be in communication with each other, directly or indirectly, over at least one bus 805.

The memory 820 may include random access memory (RAM) and read-only memory (ROM). The memory 820 may store computer-readable, computer-executable software (SW) code 825 including instructions that are configured to, when executed, cause the processor 810 to perform various functions described herein for adaptive dwell time for scan operations. Alternatively, the software code 825 may not be directly executable by the processor 810 but be configured to cause the computer (e.g., when compiled and executed) to perform functions described herein.

The processor 810 may include an intelligent hardware device, e.g., a CPU, a microcontroller, an ASIC, etc. The processor 810 may process information received through the transceiver 840 and/or to be sent to the transceiver 840 for transmission through the antennas 850. The processor 810 may handle, alone or in connection with the scan manager 615-*b*, various aspects for adaptive dwell time for scan operations.

The transceiver 840 may be configured to communicate bi-directionally with APs 105 in FIGS. 1 and 2. The transceiver 840 may be implemented as at least one transmitter and at least one separate receiver. The transceiver 840 may include a modem configured to modulate the packets and provide the modulated packets to the antennas 850 for transmission, and to demodulate packets received from the antennas 850. While the STA 110-*b* may include a single antenna, there may be aspects in which the STA 110-*b* may include multiple antennas 850.

According to the architecture of FIG. 8, the STA 110-*b* may further include a communications manager 830. The communications manager 830 may manage communications with various APs or other STAs. The communications manager 830 may be a component of the STA 110-*b* in communication with some or all of the other components of the STA 110-*b* over at least one bus 805. Alternatively, functionality of the communications manager 830 may be implemented as a component of the transceiver 840, as a computer program product, and/or as at least one controller element of the processor 810.

The components of the STA 110-*b* may be configured to implement aspects discussed above with respect to FIGS. 1-7, and those aspects may not be repeated here for the sake of brevity. Moreover, the components of the STA 110-*b* may be configured to implement aspects discussed below with respect to FIGS. 9-11, and those aspects may also not be repeated here for the sake of brevity.

Figure 9:
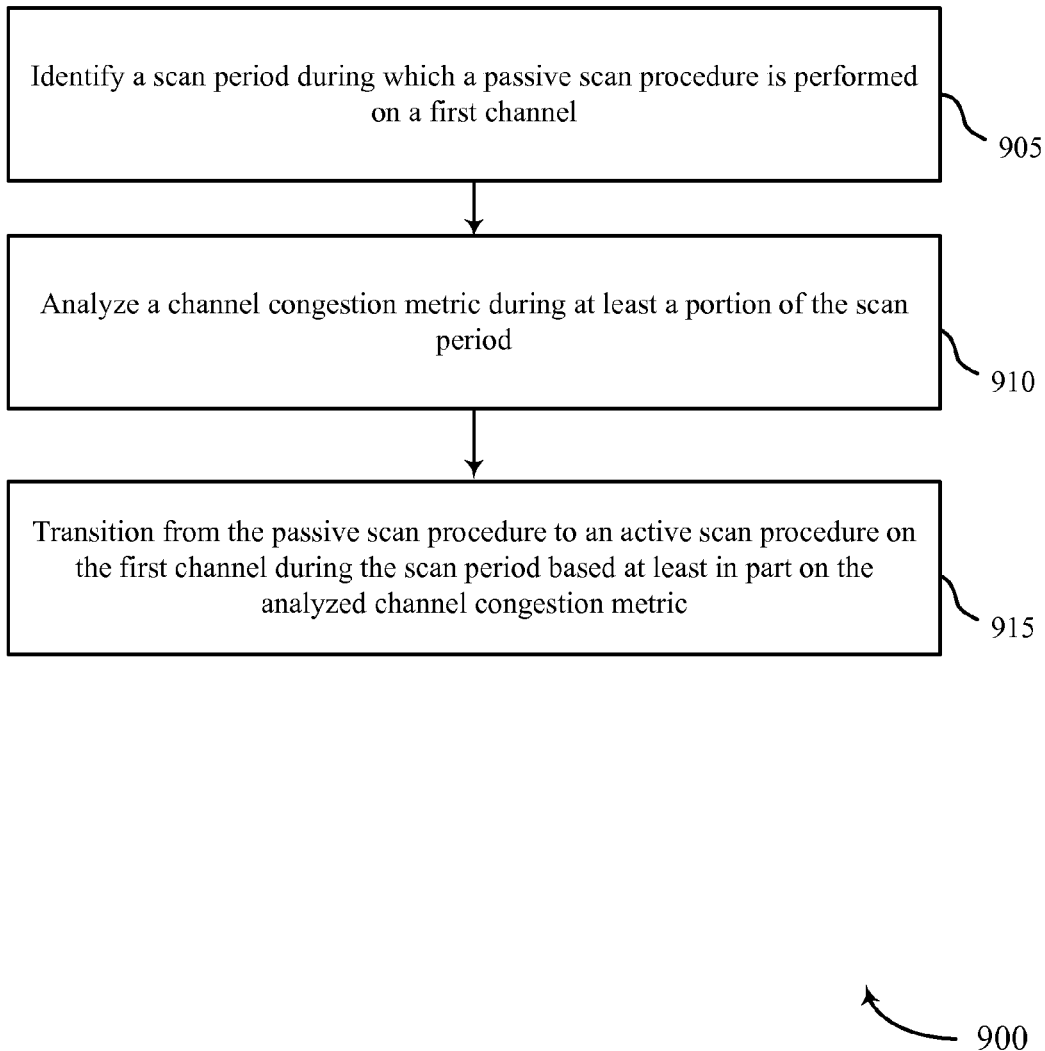
FIG. 9 is a flow chart illustrating an example of a method for wireless communication, in accordance with various aspects of the present disclosure.

FIG. 9 is a flow chart illustrating an example of a method 900 for wireless communication, in accordance with various aspects of the present disclosure. For clarity, the method 900 is described below with reference to aspects of the STAs 110 described with reference to FIGS. 1-3 and 8, and/or aspects of the apparatuses 605 described with reference to FIGS. 6-7. For example, the STAs 110 of FIGS. 1-3 and 8 and/or the apparatuses 605 of FIGS. 6-7 may be configured as a means for performing the functions described below. In some examples, a STA may execute sets of codes to control the functional elements of the STA to perform the functions described below. Additionally, or alternatively, the STA may perform the functions described below using special-purpose hardware.

At block 905, the method 900 may include a STA identifying a scan period during which a passive scan procedure is performed on a first channel. At block 910, the method 900 may include the STA analyzing a channel congestion metric during at least a portion of the scan period. At block 915, the method 900 may include the STA transitioning from the passive scan procedure to an active scan procedure on the first channel during the scan period based on the analyzed channel congestion metric.

The operation(s) at blocks 905, 910, and/or 915 may be performed using the scan manager 615 described with reference to FIGS. 6-8.

Figure 10:
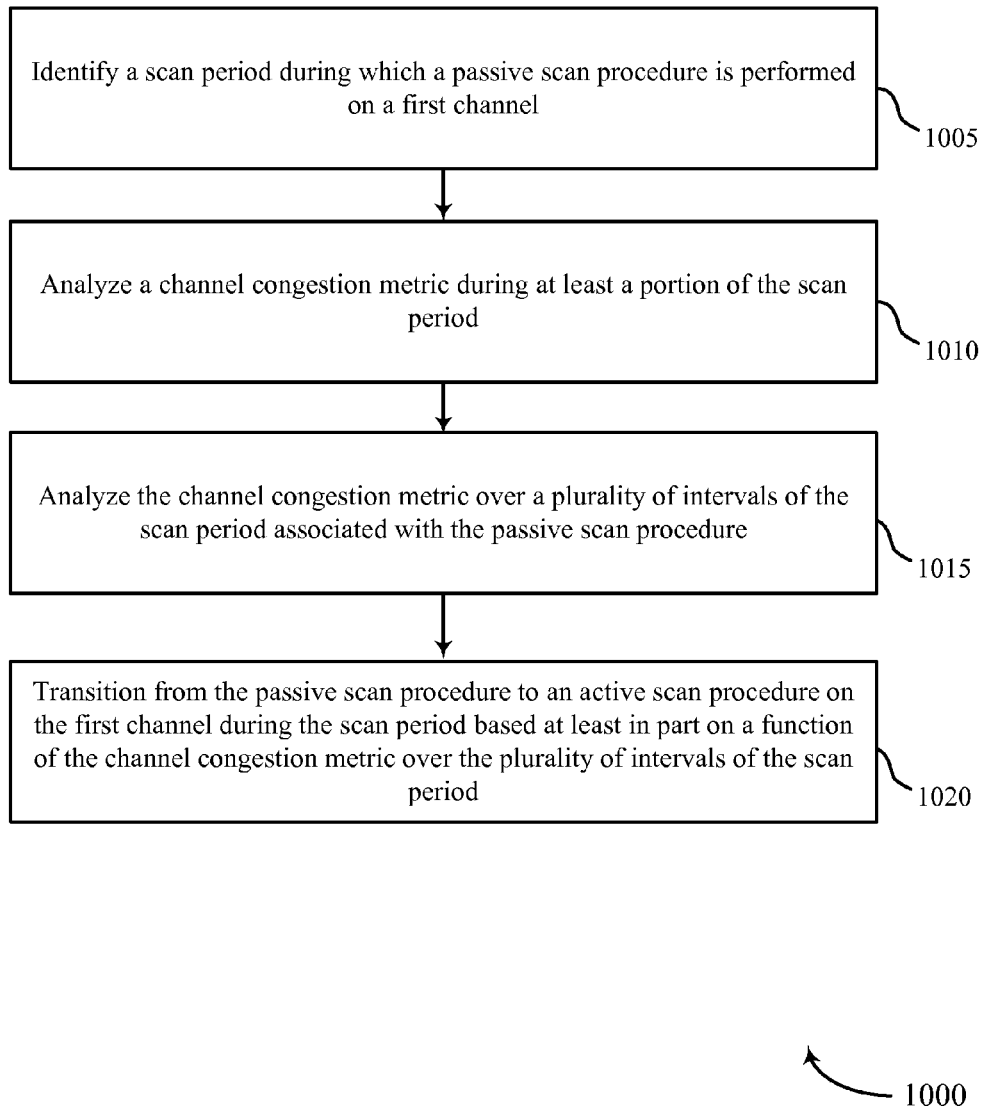
FIG. 10 is a flow chart illustrating an example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of the STAs 110 described with reference to FIGS. 1-3 and 8, and/or aspects of the apparatuses 605 described with reference to FIGS. 6-7. For example, the STAs 110 of FIGS. 1-3 and 8 and/or the apparatuses 605 of FIGS. 6-7 may be configured as a means for performing the functions described below. In some examples, a STA may execute sets of codes to control the functional elements of the STA to perform the functions described below. Additionally or alternatively, the STA may perform the functions described below using special-purpose hardware.

At block 1005, the method 1000 may include a STA identifying a scan period during which a passive scan procedure is performed on a first channel. At block 1010, the method 1000 may include the STA analyzing a channel congestion metric during at least a portion of the scan period. At block 1015, the method 1000 may include the STA analyzing the channel congestion metric over a plurality of intervals of the scan period associated with the passive scan procedure. At block 1020, the method 1000 may include the STA transitioning from the passive scan procedure to an active scan period on the first channel during the scan period based on a function of the channel congestion metric over the plurality of intervals of the scan period.

The operation(s) at blocks 1005, 1010, 1015, and/or 1020 may be performed using the scan manager 615 described with reference to FIGS. 6-8.

Figure 11:
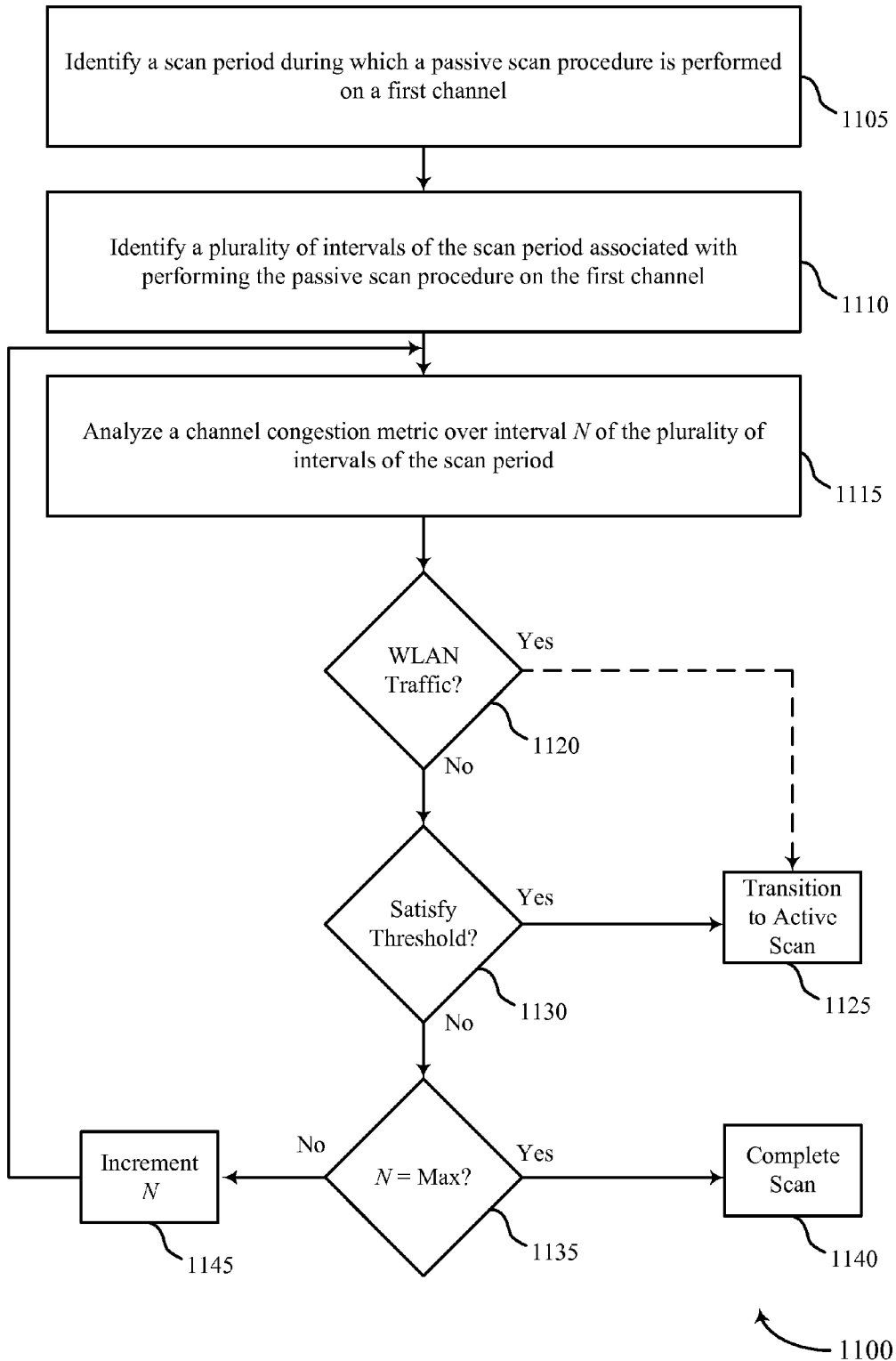
FIG. 11 is a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of the STAs 110 described with reference to FIGS. 1-3 and 8, and/or aspects of the apparatuses 605 described with reference to FIGS. 6-7. For example, the STAs 110 of FIGS. 1-3 and 8, and/or the apparatuses 605 of FIGS. 6-7 may be configured as a means for performing the functions described below. In some examples, a STA may execute sets of codes to control the functional elements of the STA to perform the functions described below. Additionally or alternatively, the STA may perform the functions described below using special-purpose hardware.

At block 1105, the method 1100 may include a STA identifying a scan period during which a passive scan procedure is performed on a first channel. At block 1110, the method 1100 may include the STA identifying a plurality of intervals of the scan period associated with performing the passive scan procedure on the first channel. At block 1115, the method 1100 may include the STA analyzing a channel congestion metric over N of the plurality of intervals of the scan period. At block 1120, the method 1100 may include the STA determining whether there is WLAN traffic on the first channel. If so, the method 1100 may optionally move to block 1125 wherein the STA transitions to an active scan procedure on the first channel during the scan period. If not, the method 1100 may move to block 1130 where the STA determines whether the channel congestion metric satisfies a threshold. If the channel congestion metric satisfies the threshold, the method 1100 may move to block 1125 where the STA transitions to an active scan procedure on the first channel during the scan period. If the channel congestion metric does not satisfy the threshold, the method 1100 moves to block 1135 where the STA determines whether N has reached a maximum N value. If N has reached a maximum value, the method 1100 may move to block 1140 where the scan on the first channel is complete (and the STA may optionally move to a scan procedure on a second channel). If N has not reached a maximum value, the method moves to block 1145 where N is incremented and returns to block 1115 where the channel congestion metric over the next interval is analyzed.

The operation(s) at blocks 1105, 1110, 1115, 1120, 1125, 1130, 1135, 1140, and/or 1145 may be performed using the scan manager 615 described with reference to FIGS. 6-8.

Thus, the methods 900-1100 may provide for wireless communication. It should be noted that the methods 900-1100 are just one implementation and that the operations of the methods may be rearranged or otherwise modified such that other implementations are possible. In some examples, aspects from two or more of the methods 900-1100 may be combined.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration. The computer-program product may include packaging materials to advertise the computer-readable medium therein for purchase by consumers.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AA or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read-only memory (EEPROM), flash memory, compact disc, read-only memory (CD-ROM) or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

What is claimed is:

1. A method for wireless communication, comprising:
    identifying a scan period during which a passive scan procedure is performed on a first channel;
    analyzing a channel congestion metric during at least a portion of the scan period;
    identifying, based at least in part on the channel congestion metric, wideband local area network (WLAN) traffic on the first channel and a second channel; and
    initiating an active scan procedure on the second channel during the scan period based at least in part on the analyzed channel congestion metric.

2. The method of claim 1, further comprising:
    identifying, based at least in part on the channel congestion metric, the wideband WLAN traffic on the first channel,
    wherein initiating the active scan procedure is based at least in part on the identified wideband WLAN traffic.

3. The method of claim 1, further comprising:
    identifying a location metric associated with wireless communications using the first channel; and
    initiating the active scan procedure based at least in part on the location metric.

4. The method of claim 1, further comprising:
    analyzing the channel congestion metric over a plurality of intervals of the scan period associated with the passive scan procedure; and
    initiating the active scan procedure based at least in part on a function of the channel congestion metric over the plurality of intervals of the scan period.

5. The method of claim 4, wherein the function of the channel congestion metric comprises a different threshold level of the channel congestion metric for each interval of the plurality of intervals.

6. The method of claim 1, further comprising:
    identifying a trend associated with the channel congestion metric over at least some of a plurality of intervals of the scan period, wherein initiating the active scan procedure is further based at least in part on the trend associated with the channel congestion metric.

7. The method of claim 1, wherein the channel congestion metric is based at least in part on a probability associated with a detection of a radar signal on the first channel.

8. The method of claim 1, wherein the channel congestion metric is based at least in part on at least one of a Wi-Fi communication associated with an apparatus, or a Wi-Fi communications within a basic subscriber set (BSS) associated with the apparatus, or a Wi-Fi communication for a BSS not associated with the apparatus, or a combination thereof.

9. The method of claim 1, further comprising:
    transitioning from the passive scan procedure to the active scan procedure on the first channel during the scan period based at least in part on the analyzed channel congestion metric.

10. An apparatus for wireless communication, comprising:
    a scan timing manager to identify a scan period during which a passive scan procedure is performed on a first channel;
    a channel congestion metric manager to analyze a channel congestion metric during at least a portion of the scan period;
    a scan transition manager to identify, based at least in part on the channel congestion metric, wideband wireless local area network (WLAN) traffic on the first channel and a second channel; and
    the scan transition manager to initiate an active scan procedure on the second channel during the scan period based at least in part on the analyzed channel congestion metric.

11. The apparatus of claim 10, wherein the channel congestion metric manager is further configured to identify, based at least in part on the channel congestion metric, the wideband WLAN traffic on the first channel, wherein initiating the active scan procedure is based at least in part on the identified wideband WLAN traffic.

12. The apparatus of claim 10, wherein the channel congestion metric manager is further configured to identify a location metric associated with wireless communications using the first channel; and
    wherein the scan transition manager is further configured to initiate the active scan procedure based at least in part on the location metric.

13. The apparatus of claim 10, wherein the channel congestion metric manager is further configured to analyze the channel congestion metric over a plurality of intervals of the scan period associated with the passive scan procedure; and the scan transition manager is further configured to initiate the active scan procedure based at least in part on a function of the channel congestion metric over the plurality of intervals of the scan period.

14. The apparatus of claim 13, wherein the function of the channel congestion metric comprises a different threshold level of the channel congestion metric for each interval of the plurality of intervals.

15. The apparatus of claim 10, wherein the channel congestion metric manager is further configured to identify a trend associated with the channel congestion metric over at least some of a plurality of intervals of the scan period, wherein initiating the active scan procedure is further based at least in part on the trend associated with the channel congestion metric.

16. The apparatus of claim 10, wherein the channel congestion metric is based at least in part on a probability associated with a detection of a radar signal on the first channel.

17. The apparatus of claim 10, wherein the channel congestion metric is based at least in part on at least one of a Wi-Fi communication associated with the apparatus, or a Wi-Fi communications within a basic subscriber set (BSS) associated with the apparatus, or a Wi-Fi communication for a BSS not associated with the apparatus, or a combination thereof.

18. The apparatus of claim 10, wherein the scan transition manager is further configured to transition from the passive scan procedure to the active scan procedure on the first channel during the scan period based at least in part on the analyzed channel congestion metric.

19. An apparatus for wireless communication, comprising:
    means for identifying a scan period during which a passive scan procedure is performed on a first channel;
    means for analyzing a channel congestion metric during at least a portion of the scan period;
    means for identifying, based at least in part on the channel congestion metric, wideband wireless local area network (WLAN) traffic on the first channel and a second channel; and
    means for initiating an active scan procedure on the second channel during the scan period based at least in part on the analyzed channel congestion metric.

20. The apparatus of claim 19, further comprising:
    means for identifying, based at least in part on the channel congestion metric, the wideband WLAN traffic on the first channel,
    wherein initiating the active scan procedure is based at least in part on the identified wideband WLAN traffic.

21. The apparatus of claim 19, further comprising:
    means for identifying a location metric associated with wireless communications using the first channel; and
    means for initiating the active scan procedure based at least in part on the location metric.

22. The apparatus of claim 19, further comprising:
    means for analyzing the channel congestion metric over a plurality of intervals of the scan period associated with the passive scan procedure; and
    means for initiating the active scan procedure based at least in part on a function of the channel congestion metric over the plurality of intervals of the scan period.

23. The apparatus of claim 22, wherein the function of the channel congestion metric comprises a different threshold level of the channel congestion metric for each interval of the plurality of intervals.

24. The apparatus of claim 19, further comprising:
    means for identifying a trend associated with the channel congestion metric over at least some of a plurality of intervals of the scan period, wherein initiating the active scan procedure is further based at least in part on the trend associated with the channel congestion metric.

25. The apparatus of claim 19, wherein the channel congestion metric is based at least in part on a probability associated with a detection of a radar signal on the first channel.

26. The apparatus of claim 19, wherein the channel congestion metric is based at least in part on at least one of a Wi-Fi communication associated with the apparatus, or a Wi-Fi communications within a basic subscriber set (BSS) associated with the apparatus, or a Wi-Fi communication for a BSS not associated with the apparatus, or a combination thereof.

27. The apparatus of claim 19, further comprising:
    means for transitioning from the passive scan procedure to the active scan procedure on the first channel during the scan period based at least in part on the analyzed channel congestion metric.

28. A non-transitory computer-readable medium storing computer-executable code for wireless communication, the code executable by a processor to:
    identify a scan period during which a passive scan procedure is performed on a first channel;
    analyze a channel congestion metric during at least a portion of the scan period;
    identify, based at least in part on the channel congestion metric, wideband wireless local area network (WLAN) traffic on the first channel and a second channel; and
    initiate an active scan procedure on the second channel during the scan period based at least in part on the analyzed channel congestion metric.

29. The non-transitory computer-readable medium of claim 28, wherein the code is further executable by the processor to:
    transition from the passive scan procedure to the active scan procedure on the first channel during the scan period based at least in part on the analyzed channel congestion metric.

\* \* \* \* \*